United States Patent
Baba

(10) Patent No.: US 7,397,573 B2
(45) Date of Patent: Jul. 8, 2008

(54) OPTION MODULE, OPTION PROGRAM, PRINTING SYSTEM

(75) Inventor: Yoshiyuki Baba, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 896 days.

(21) Appl. No.: 10/803,196

(22) Filed: Mar. 18, 2004

(65) Prior Publication Data

US 2004/0227969 A1   Nov. 18, 2004

(30) Foreign Application Priority Data

Mar. 26, 2003   (JP)   ............................. 2003-086348

(51) Int. Cl.
G06F 15/00   (2006.01)

(52) U.S. Cl. ............... 358/1.13; 358/1.9; 358/1.15; 358/1.16; 358/1.17; 358/444

(58) Field of Classification Search ............... 358/1.9, 358/1.13, 1.15, 1.16, 1.17, 443, 444
See application file for complete search history.

(56) References Cited

U.S. PATENT DOCUMENTS 6,356,357 B1 *   3/2002   Anderson et al. .......... 358/1.17
2003/0084085 A1 *   5/2003   Breidenbach et al. .......... 709/1

* cited by examiner

Primary Examiner—Edward L. Coles
Assistant Examiner—Chan S Park
(74) Attorney, Agent, or Firm—Hogan & Hartson LLP

(57) ABSTRACT

There is provided an option module for a printer, capable of preserving versatility while reducing possibility of ending in an error. An option module for realizing a specific function while being connected to a printer has a unit for inquiring to a printer connected thereto (below, referred to as "the connected printer") regarding a print function usable with the connected printer, and only the print function usable with the connected printer is designated and operated, realizing the specific function.

2 Claims, 4 Drawing Sheets

OPTION MODULE, OPTION PROGRAM, PRINTING SYSTEM

BACKGROUND

The present invention relates to a technique of operating an option module for realizing a specific function while being connected to a printer.

In recent years, many printers are constructed such that various option modules can be connected thereto to expand printer functions. For example, in many cases, functions (e.g., RIP: Raster Image Processor) for analyzing data described in postscript and other printer control languages to generate a print image are provided as option modules, in which a device has dedicated hardware for realizing RIP or other functions, or a ROM module or the like stores software for realizing RIP or other functions.

SUMMARY

Conventionally, there are many cases in which operations of the option module for performing RIP, etc. are designed based on a premise that a printer to which the option module will be connected can utilize or execute a specific print function (such as a function to print at a specific resolution level, etc.).

In other words, the conventional option module is constructed to operate as though the specific print function is usable, regardless of what type of print function is actually usable with the printer to which it will be connected. Therefore, there was a possibility that the data or instructions which the printer cannot process will be included in processing results of the option module. In such a case, the printer recognizes the operation results of the option module as an error, and there are many instances where the print processing itself ends in an error. This became one cause of the printer being unable to execute normal printing.

In order to solve this problem, if the option module is created as a dedicated device for a specific printer, it is possible to design the operations of the option module with advance consideration for the print functions that are usable with the printer, whereby the above-mentioned problems can be avoided. However, in this case, option modules must be created for each printer. This drastically reduces the versatility of the option module, and bloats development costs and the like.

In order to overcome these problems, an object of the present invention is to provide an option module that is capable of preserving versatility while reducing the possibility of ending in an error, and printing system that utilizes such an option module.

To achieve the above-mentioned objective, an option module according to the present invention is an option module for realizing a specific function while being connected to a printer comprises: means for inquiring to a printer to which the option module is connected (below, referred to as "the connected printer") regarding a printer function usable with the connected printer, and only the printer function that is usable with the connected printer is designated and operated, thus realizing the specific function. Preferably, the option module is a memory device storing a program, and the program is executed on a printer to achieve the specific function. This construction eliminates the possibility that printer functions that are not usable with the printer will be included in the operation results of the option module. As a result, this avoids the problem in which the printer recognizes the operation results of the option module as an error and normal printing cannot be performed.

Preferably, the specific function is a function for generating the print image based on data described in the printer control language. This construction eliminates the possibility that print functions which are not usable by the printer will be included in the operation results of the option module, which are the results from analyzing the data described in the printer control language. As a result, this avoids the problem in which the printer recognizes the operation results of the option module as an error and normal printing cannot be performed.

Preferably, the print function includes any one of the following print functions: a function for printing at a specific resolution level, a double-sided print function, a print function using a secondary memory device, a print function using a specific paper feeder or paper discharge tray, a print function using a mailbox, a collate print (per-copy print) function, and a color print function. This construction enables the option module to operate in accordance with various printers having any of the various print functions mentioned above, and preserves high versatility.

A control method according to the present invention is a control method for an option module for realizing a specific function while being connected to a printer comprises the steps of: inquiring to the connected printer regarding a print function usable with the connected printer; and designating only the print function usable with the connected printer and executing operations to realize the specific function.

An option program according to the present invention is an option program for a printer for realizing a specific function causes a computer to function as: means for inquiring to the printer installed with the option program regarding a print function usable with the printer; and means for designating only the print function usable with the connected printer and executing operations to realize the specific function. The option program of the present invention can be installed or loaded onto the computer (printer) through a CD-ROM, a magnetic disk, a semiconductor memory or other various storage media, or via a communications network.

A printing system according to the present invention comprises: the option module of the present invention; and a printer constructed so as to be able to connect with the option module.

Note, however, in the present specification, "means" does not only mean physical means, but also includes cases where functions of the "means" are realized by software. Furthermore, functions of one "means" may be realized by two or more physical means, and functions of two or more "means" may be realized by one physical means.

DETAILED DESCRIPTION

First Embodiment

Figure 1:
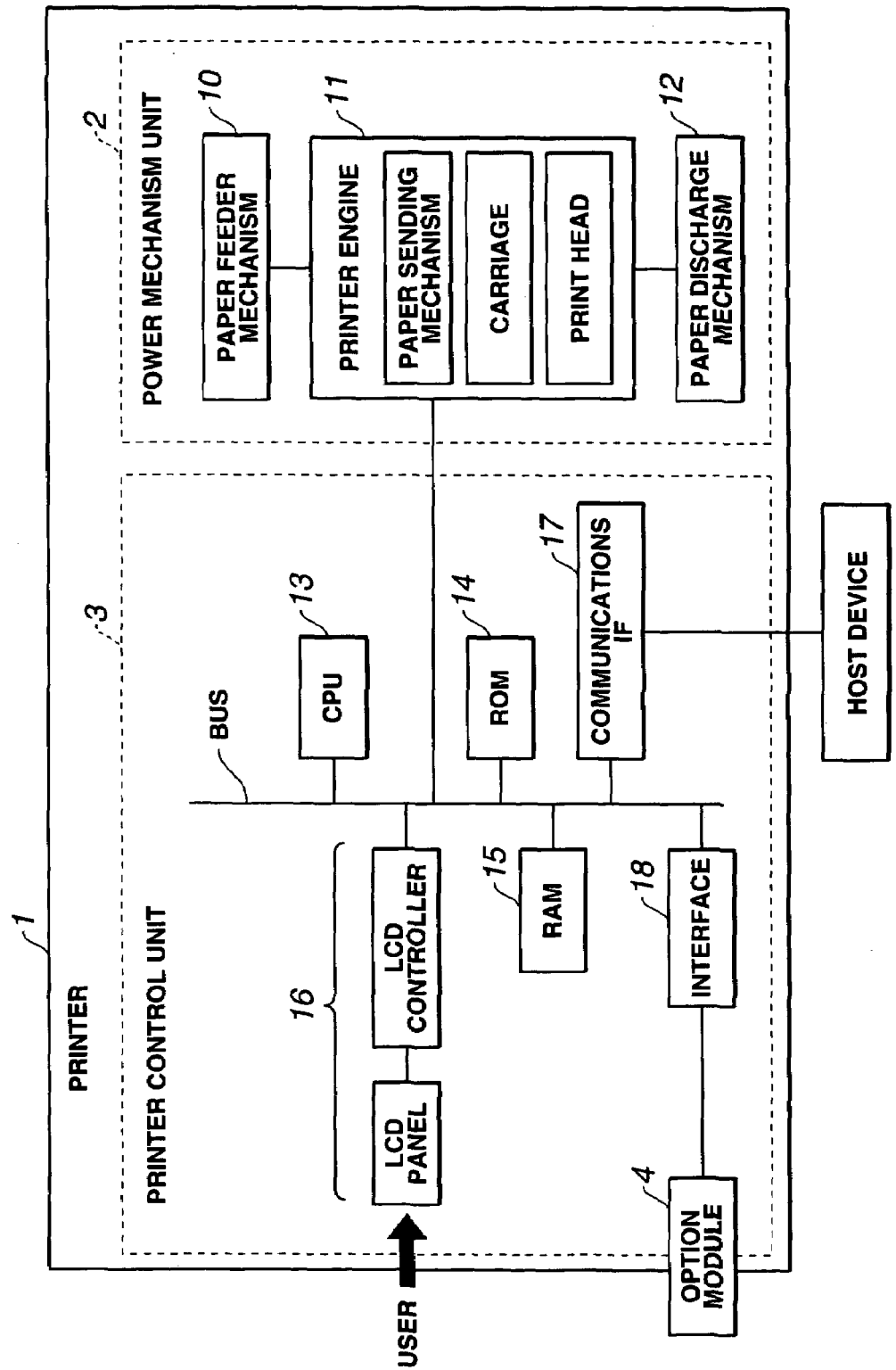
FIG. 1 is a block diagram showing hardware constructions of a printer 1 and an option module 4 in accordance with a first embodiment.

Explanation will now be given regarding a first embodiment of the present invention, with reference made to the diagrams. FIG. 1 is a block diagram showing a hardware construction of a printer 1 and an option module 4 in accordance with the present embodiment.

The printer 1 includes a power mechanism unit 2, which is constituted by a paper feeder mechanism 10 for feeding paper into the printer, a printer engine 11 for printing text and the like, a paper discharge mechanism 12 for discharging paper to outside the printer, etc. The printer engine 11 is constituted so as to include a paper sending mechanism, a carriage mechanism, a print head, etc.

These parts of the power mechanism unit 2 are controlled and caused to perform print operations by a printer control unit 3, which includes a CPU (processor) 13, a ROM 14, a RAM 15, an LCD panel and an LCD controller 16, a communications interface 17, an interface 18 for connecting the option module 4, etc.

The CPU 13 is constructed so as to be able to access each of the means 14 to 18 via an bus, and controls the power mechanism unit 2 to make it actually perform print operations in accordance with a print job that is sent from a host device via the communications interface 17. However, the power mechanism unit 2 may have an independent CPU. In this case, the CPU of the power mechanism unit 2 performs communications with the CPU 13 via a parallel interface or the like, and controls the printer engine 11 to make it perform the print operations.

The option module 4 is constructed so as to realize specific functions while being connected to the printer 1 via the interface 18. The option module 4 can be constructed by means of, for example, a ROM module or a printer card or the like storing an option program for realizing the specific functions. In this case, the ROM module or the like is built into the printer 1 so as to incorporate the option program into the printer 1.

The functions of the option module 4 can be determined in accordance with design concerns. As one example, explanation is given regarding a case in which the option module 4 realizes a function of generating a print image based on data described in a printer control language.

As a general rule, the construction and operations of printer 1 and the option module 4 are similar to the construction and operations of a conventional printer device and a conventional option module.

However, the option module 4 of the present embodiment is different from the conventional technique in that it has means for inquiring to the printer 1 about usable print functions, and in that only usable print functions of the printer 1 are designated and operated.

Figure 2:
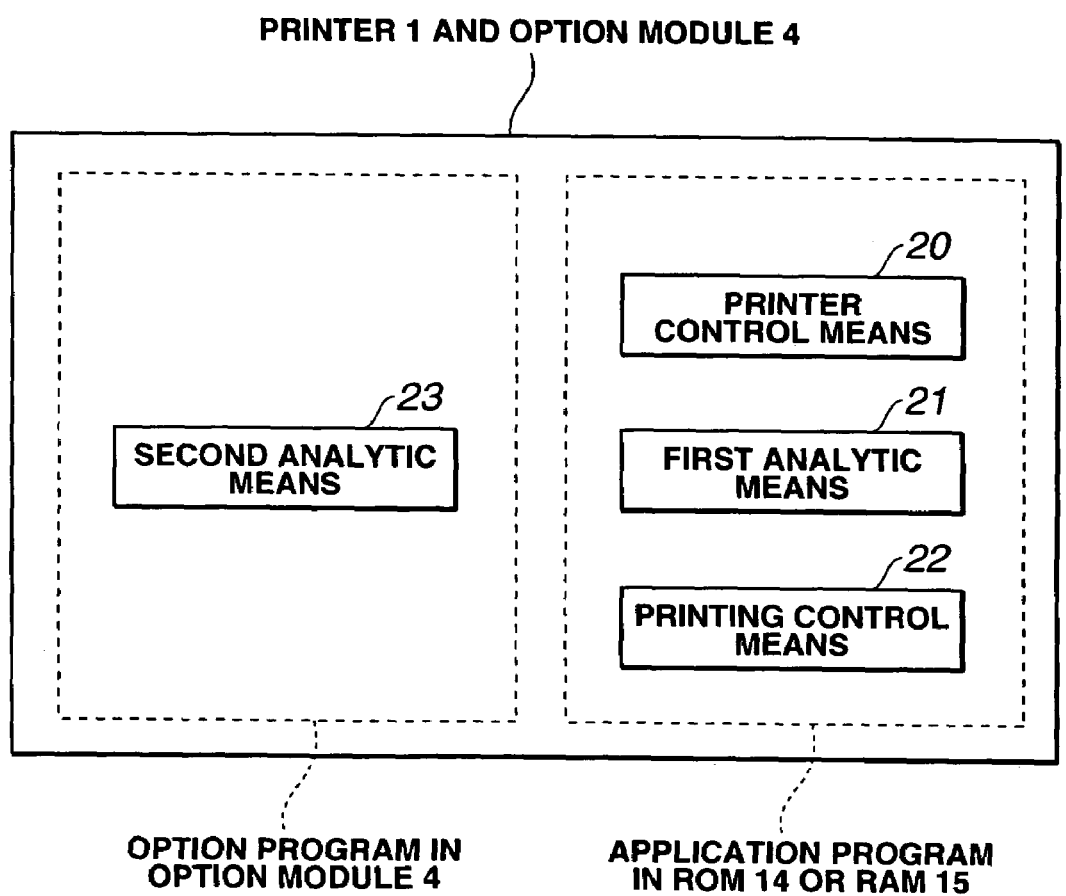
FIG. 2 is a block diagram showing a functional structural diagram of the printer 1 and the option module 4 in accordance with the first embodiment.

FIG. 2 is a structural diagram of essential functions in the printer 1 and the option module 4. As shown in the diagra, the printer 1 and the option module 4 are constructing including printer control means 20, first analytic means 21 corresponding to a first printer control language (e.g., ESC/Page), print control means 22, second analytic means 23 corresponding to a second printer control language (e.g., postscript), etc.

The printer control means 20, the first analytic means 21, and the printing control means 22 are functionally realized by the CPU 13 executing application programs stored in the ROM 14 or the RAM 15. The second analytic means 23 is functionally realized by the CPU 13 executing the option program stored in the option module 4. Preferably, the CPU 13 executes programs for realizing each of the means on a real-time multi-tasking OS.

The functional means realized by thus executing the programs can be understood as tasks (or processes). In other words, the printer control means, the first analytic means, the printing control means and the second analytic means can be understood, respectively, as a printer control task, a first analytic task, a printing control task and a second analytic task, which are each performed by the CPU 13. Below, as along as there is no particular need to distinguish between "means" and "tasks", only "task" will be used.

In addition to the tasks mentioned above, the printer 1 and the option module 4 can also perform image processing (size conversion processing, noise elimination processing, etc.) tasks and the like which common printers can perform.

Figure 3:
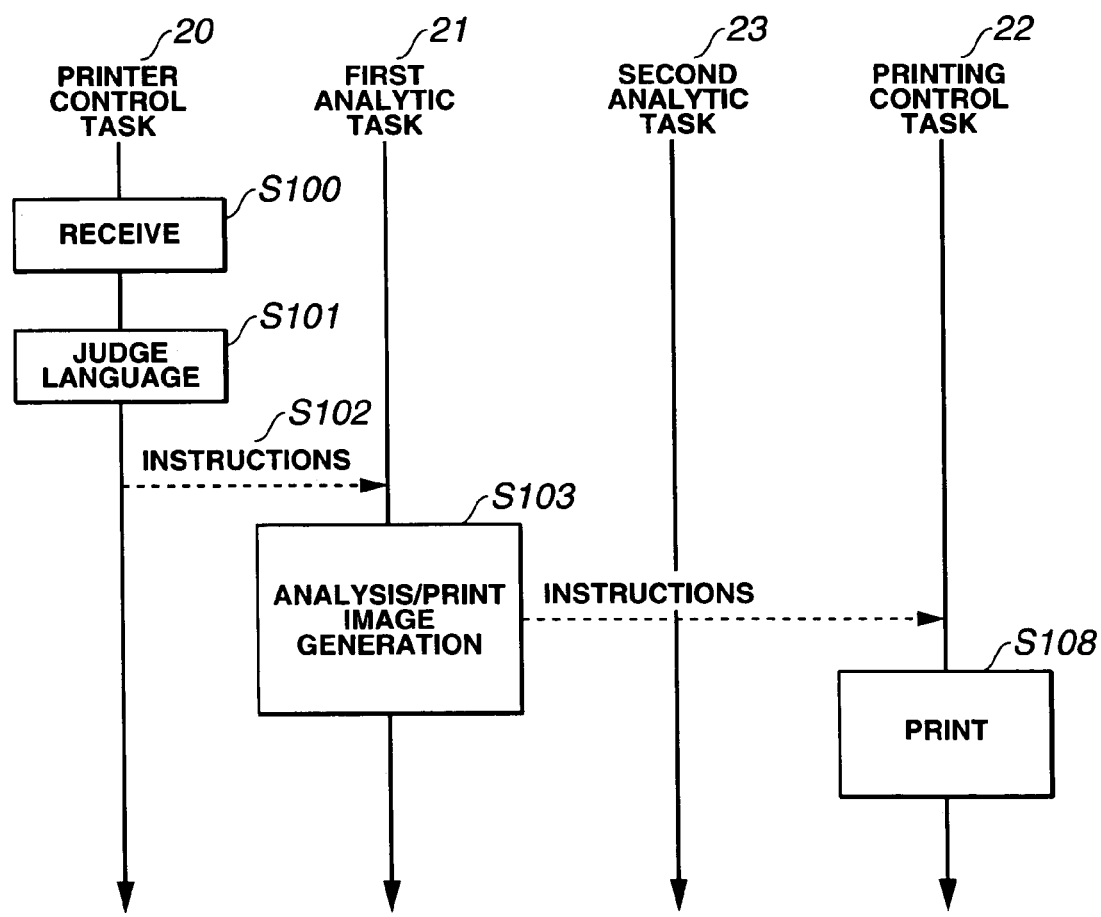
FIG. 3 is a diagram for explaining operations of each task in accordance with the first embodiment.
Figure 4:
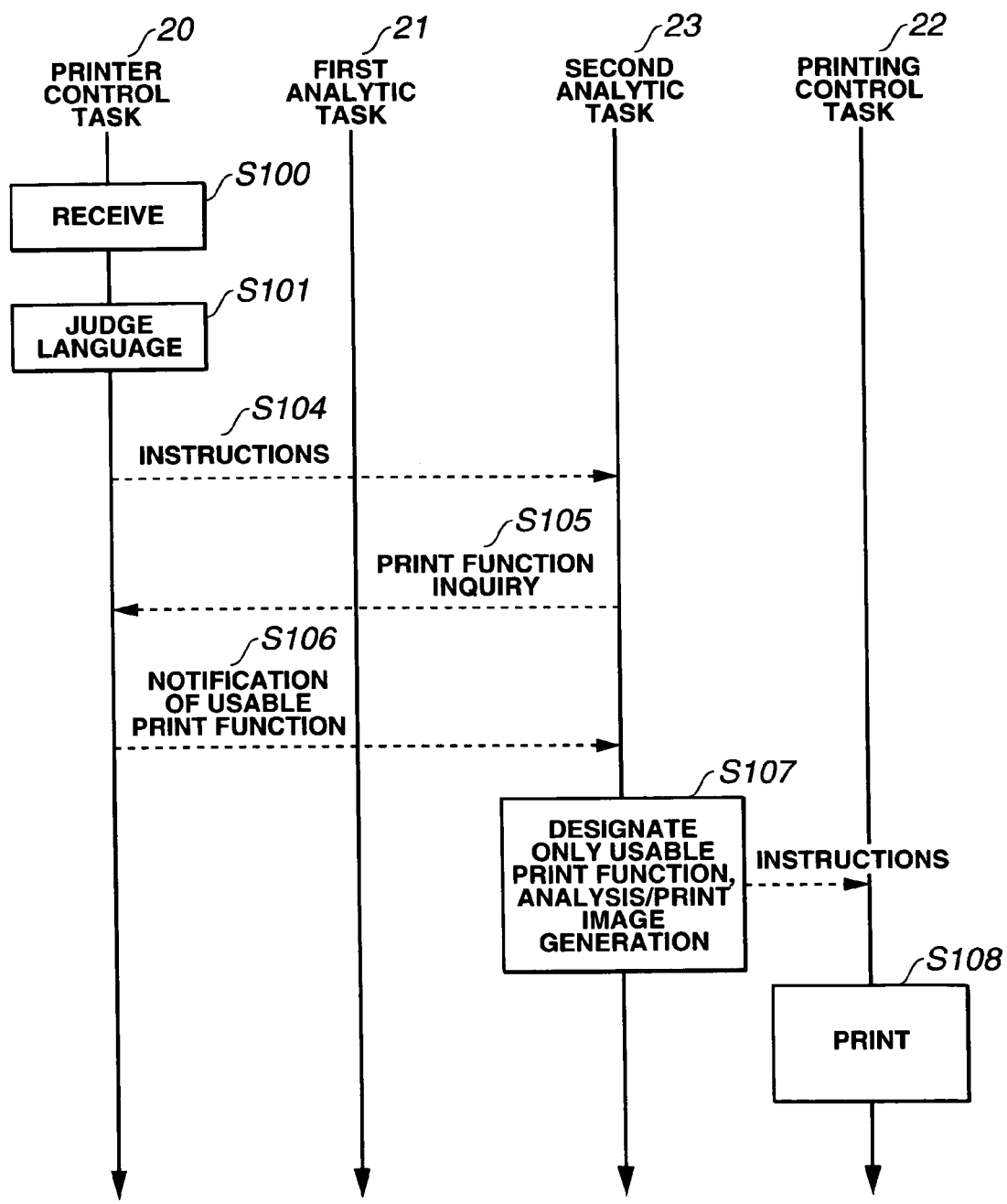
FIG. 4 is another diagram for explaining operations of each task in accordance with the first embodiment.

Explanation will now be given regarding operations (i.e., processing content) of each task, with reference made to FIG. 3 and FIG. 4.

The printer control task 20 receives a print job (print data and control commands) described in the first or the second printer control language from the host device via the network, and stores this into a receiving buffer (S100).

Then, based on a portion of the print job (e.g., its header data), the printer control task 20 judges whether the language in which the print job is written is the first or the second printer control language (S101).

If the printer control task 20 judges that the print job is written in the first printer control language (this is the case shown in FIG. 3A), then the printer control task 20 instructs the first analytic task 21 to start the processing for that print job (S102).

In the case where the first analytic task 21 receives instructions from the printer control task 20 to start the processing, the first analytic task 21 performs the following processing: processing to sequentially read out and analyze the print data from the reception buffer and generate 1 band or 1 page of raster format print image and store this into an image buffer, and processing to sequentially read out and interpret the control commands from the reception buffer and output specific instructions (a print request, a send paper request, a feed/discharge paper request, etc.) to the printing control task 22, etc. (S103).

On the other hand, in the case where the printer control task 20 judges that the print job is written in the second printer control language (this is the case shown in FIG. 4), the printer control task 20 then instructs the second analytic task 23 to start processing for the print job (S104).

In the case where the second analytic task 23 receives instructions to start the processing from the printer control task 20, the second analytic task 23 then inquires to the printer control task 20 regarding whether or not the printer 1 can use specific print functions (S105).

Here, the inquired print functions may include, for example, a function to print at a specific resolution level, a double-sided print function, a print function using a secondary memory device (e.g., a function to generate a print image on a secondary memory device and execute high-speed printing, etc.), a print function using a specific paper feeder or paper discharge tray, a print function using a mailbox (e.g., a function to sort printed materials separately according to the sources from which the print jobs were sent, etc.), a collate print (per-copy print) function, a color print function, etc.

When the above-mentioned inquiry has been received from the second analytic task 23, the printer control task 20 notifies the second analytic task 23 whether or not each print function is usable (S106).

After the second analytic task 23 receives the notification from the printer control task 20, the second analytic task 23 then performs the following processing similarly to the first analytic task 21: processing to sequentially read out and analyze the print data from the reception buffer and generate 1 band or 1 page of raster format print image and store this into a image buffer, and processing to sequentially read out and interpret the control commands from the reception buffer and output specific instructions (a print request, a send paper request, a feed/discharge paper request, etc.) to the printing control task 22, etc. (S107).

When this occurs, the second analytic task 23 designates only the usable print function(s) of the printer 1 based on the above-mentioned notification and executes the above-mentioned processing. That is, in the case where the analysis results and the control commands designate a print function which the printer 1 cannot use, the second analytic task23 designates another similar usable print function in replace of that unusable print function, or cancel that designation of unusable print function, and then perform the operations to generate the print image and output instructions to the printing control task 22 and the like.

As an example, a case where the printer 1 can only print at 300 dpi resolution is considered. If the analysis results of the print data designate printing at 600 dpi resolution, the second analytic task 23 will then replace the 600 dpi designation with a 300 dpi designation, which can be used by the printer 1, and the print image is generated.

In another example, consider a case where the printer 1 only has a first paper feeder tray, and a second paper feeder tray. If the control command designates usage of a third paper feeder tray, then the second analytic task 23 replaces the designation for the third paper feeder tray with a designation for the first paper feeder tray or the second paper feeder tray, which can be used by the printer 1, and then the instructions are outputted to the printing control task 22.

In yet another example, consider a case where no secondary memory device is connected to the printer 1. If the control command designates usage of a secondary memory device, since there is no other similar print function that can replace the usage of the secondary memory device, the second analytic task 23 first cancels the designation for usage of the secondary memory device and then outputs the instructions to the printing control task 22 or the like.

When the printing control task 22 has received the instructions from the first analytic task 21 or the second analytic task 23, the printing control task 22 then controls the paper feeder mechanism, etc. of the printer engine 11 so as to configure the status necessary to start printing. Then, if the above-mentioned instructions request printing, then a given unit (e.g., 1 pass) of the print image is forwarded from the image buffer to the printer engine 11 and the printer engine 11 is controlled as the printing is executed (S108).

Thus, the present embodiment is configured such that the option module 4 (the second analytic task 23) inquires to the printer 1 (the printer control task 21), which is the connection destination, about the print functions usable with the printer 1, and then only the print function(s) that are usable with the printer 1 are designated and operations are performed. This eliminates the possibility that the results of the operations by the option module 4 will include print functions that cannot by used with the printer 1. This avoids the problem where the printer 1 recognizes the option module 4 operation results as an error and thus cannot perform normal printing.

In particular, since only those print functions are designated which are usable with the printer that is the connection destination, in a case where the option module 4 has been connected to a printer where many print functions can be used, the printing can be executed using these rich print functions. On the other hand, even in a case where the option module 4 is connected to a printer where only a few print functions can be used, the print functions can be executed normally without ending in errors. Since this construction is used which enables the operations tailored to the printer, the high versatility of the option module 4 can be preserved.

MODIFIED EXAMPLE

The present invention is not limited to the above-mentioned embodiment and can be applied with many kinds of variations.

For example, the second analytic task 23 does not necessarily have to inquire to the printer control task 21 about the usable print functions every time the second analytic task 23 is booted up. One can think of many kinds of modified examples such as, for example, a construction in which the inquiry is made the first time the second analytic task 23 is booted up after the power supply to the printer 1 has been turned on, or a construction in which the inquiry is made in a case where a change occurs in the print functions that are usable with the printer 1, or a construction in which a judgment of whether or not to perform the inquiry is performed based on time elapsed since a previous booting, etc.

In another example, instead of the construction where the inquiry is performed from the second analytic task 23, it is also possible to use a construction in which the print functions that are usable with the printer 1 are actively notified to the second analytic task 23 from the printer control task 20. In this case, the second analytic task 23 can omit the inquiry processing and can immediately go to RIP processing and the command processing.

In yet another example, the first analytic task 21 does not necessarily have to be provided to the printer 1 itself. Rather, it is also possible to use a construction in which the first analytic task 21 is realized by means of the option module of the present invention similarly to the second analytic task 23, or a construction in which the first analytic task 21 is provided to the host device.

In yet another example, in the embodiments described above the analytic task was explained as an example of the functions realized by the option module 4, but the present invention is not necessarily restricted to this construction, and a construction may also be used in which, for example, the option module 4 realizes the printing control task or other functions.

In yet another example, the option module 4 may also be provided with an independent CPU or dedicated hardware. For example, a construction is conceivable in which the CPU of the option module 4 executes the option program to realize the second analytic task 23, performs communications with the CPU 13 via the interface 18, and inquires to the printer control task 20. Conversely, it is also possible to use a construction which does not include the option module 4, but rather communicates directly with the communications network to download the option programs of the present invention to, for example, the RAM 15 of the printer 1.

Finally, the technique of the present invention can be applied not only in, for example, a laser printer, an inkjet printer, a label printer or other such apparatus commonly referred to as a printer, but also in various information processing devices equipped with image formation functions (such as a copier, a FAX, a handy terminal, etc.).

The entire disclosure of Japanese Patent Application No. 2003-86348 filed on Mar. 26, 2003 including specification, claims, drawings and summary are incorporated herein by reference in its entirety.

I claim:

1. A printer system comprising an option module for performing a specific function while being connected to a printer, the printer system comprising:

a printer control means for receiving a print job and storing the print job in a receiving buffer;

the printer control means deciding, based on a portion of the print job, a printer control language in which the print job is written; wherein, if the printer control means decides that the print job is written in a first printer control language, then the printer control means instructing a first analytic means to start processing the print job;

the first analytic means, upon receiving instructions from the printer control means, sequentially reading out and analyzing the print data from the receiving buffer and generating a band or page of raster format print image and storing the band or page of raster format print image an image buffer, and sequentially reading out and interpreting control commands from the receiving buffer and output specific instructions to the printer control means; and wherein if the printer control means decides that the print job is written in a second printer control language, the printer control means instructs a second analytic means to start processing the print job; and wherein, the second analytic means, upon receiving the instruction from the printer control means, inquiring to the printer control means regarding whether or not the printer can use specific print functions; and wherein upon receiving the inquiry from the second analytic means; the printer control means notifying the second analytic means as to whether or not each print function is usable, the second analytic means, upon receiving the notification from the printer control means, and designating only the usable print functions based on the notification, sequentially reading out and analyzing the print data from the receiving buffer and generating a band or page of raster format print image and storing the print data into an image buffer and processing to sequentially read out and interpret the control commands from the reception buffer and output specific instructions to the printing control means;

upon receiving the instructions from the first analytic means or the second analytic means, the printing control means controlling the printer engine so as to configure the status necessary to start printing.

2. A control method for an option module for performing a specific function while being connected to a printer, comprising the steps of:

receiving a print job and storing the print job in a receiving buffer;

deciding, based on a portion of the print job, a printer control language in which the print job is written; wherein, if it is decided that the print job is written in a first printer control language, then instructing a first analytic means to start processing the print job;

the first analytic means, upon receiving instructions from the printer control means, sequentially reading out and analyzing the print data from the receiving buffer and generating a band or page of raster format print image and storing the band or page of raster format print image into an image buffer, and sequentially reading out and interpreting control commands from the receiving buffer and output specific instructions to the printer control means; and wherein if it is decided that the print job is written in a second printer control language, instructing a second analytic means to start processing the print job; and wherein the second analytic means, upon receiving the instruction from the printer control means, inquiring to the printer control means regarding whether or not the printer can use specific print functions; and wherein upon receiving the inquiry from the second analytic means; the printer control means notifying the second analytic means as to whether or not each print function is usable, the second analytic means, upon receiving the notification from the printer control means, and designating only the usable print functions based on the notification, sequentially reading out and analyzing the print data from the receiving buffer and generating a band or page of raster format print image and storing the print data into an image buffer and processing to sequentially read out and interpret the control commands from the reception buffer and output specific instructions to the printing control means;

upon receiving the instructions from the first analytic means or the second analytic means, the printing control means controlling the printer engine so as to configure the status necessary to start printing.

* * * * *